INVENTOR:
Robert F. Anderson

ATTORNEYS

United States Patent Office 3,707,580
Patented Dec. 26, 1972

3,707,580
HYDROGEN FLUORIDE ALKYLATION WITH APPARATUS HAVING A VENTURI-SHAPED CHAMBER
Robert F. Anderson, La Grange Park, Ill., assignor to Universal Oil Products Company, Des Plaines, Ill.
Filed June 3, 1971, Ser. No. 149,593
Int. Cl. C07c 3/54
U.S. Cl. 260—683.48
11 Claims

ABSTRACT OF THE DISCLOSURE

An alkylatable reactant is alkylated with an olefin-acting reactant, utilizing a fluid catalyst, by passing the reactants and catalyst through a venturi-shaped zone and a retention zone into a separation zone. A catalyst phase and a reaction products phase are separated and the catalyst phase is withdrawn. A first portion of the reaction products phase is withdrawn and a second portion is passed through a refluxing zone. The portion of reaction products phase withdrawn from the separation zone is recycled to the venturi-shaped zone. Catalyst is introduced into the downstream end of the refluxing zone and passed counter-currently to the second portion of reaction products. The second portion of the reaction products is withdrawn and the product of the process is recovered from it. Also disclosed is a novel unitary alkylation apparatus comprising, in combination, a venturi-shaped chamber, a retention chamber, a settling chamber and a refluxing chamber.

BACKGROUND

This invention relates to a process for producing an alkylation reaction product from an alkylatable reactant and an olefin-acting reactant utilizing a fluid catalyst.

This invention also relates to a novel apparatus for producing an alkylation reaction product.

In one aspect, this invention relates to a process and apparatus, utilizing a fluid catalyst, for producing an isoparaffin-olefin reaction product which may be used as a motor fuel component. The process and apparatus herein disclosed provide a method for producing an isoparaffin-olefin reaction product which possesses excellent anti-knock properties and which may be utilized to upgrade the octane level of unleaded motor fuels.

Alkylation processes are employed to create higher molecular weight compounds from lower molecular weight olefin-acting compounds and alkylatable compounds. For example, aromatic hydrocarbons may be alkylated with $C_{10}$–$C_{20}$ olefins to produce higher molecular weight alkyl-aromatics which are useful as detergents. Aromatics may also be alkylated with $C_2$–$C_{10}$ olefins to produce resin and plastics precursors such as ethylbenzenes, propylbenzenes, etc.

Among the most important products of fluid-catalyzed alkylation is the motor fuel alkylate produced in acid-catalyzed alkylation of $C_4$–$C_6$ isoparaffins with $C_3$–$C_5$ olefins. Generally, isobutane is alkylated with butene isomers or a mixture of propene and butenes utilizing hydrogen fluoride or sulfuric acid as a catalyst. The alkylate made in these processes generally has a fairly high octane rating which may be improved significantly by the addition of alkyl lead compounds. When such compounds as tetramethyl or tetraethyl lead are added to this alkylate product, its octane rating is high enough that it may be blended with other hydrocarbon components to create a motor fuel product having a desirably high octane rating. At present, it has been found desirable to minimize the use of alkyl lead compounds to upgrade the octane rating of motor fuel alkylate. At the same time, motor fuel octane requirements remain high. There is, thus, a present demand for motor fuel alkylate having a high enough octane rating without the addition of lead, or with very little lead, that it may be used economically as a motor fuel blending component. The alkylation processes and apparatus which are presently in use will not produce a product of sufficiently high octane to meet this demand in an economical manner. The process and apparatus herein disclosed provide a method for producing the high octane alkylate needed to satisfy the demand for high octane unleaded motor fuels.

One of the problems associated with hydrogen halide-catalyzed alkylation processes, particularly those employing a hydrogen fluoride catalyst, has been the production of alkyl halides, which are undesirable in the final products of alkylation processes, but are troublesome to separate from more valuable reaction products. For example, in an isoparaffin-olefin alkylation process employing hydrogen fluoride catalyst, the reactants and catalyst are thoroughly mixed to form a reaction mixture. After the alkylation reaction has taken place, the product and unconsumed reactants form one phase and the catalyst forms a second phase. The alkyl halides created collect in the reaction products phase. Since these halides can be reacted with alkylatable reactant to form the desired products, it is desirable to eliminate them in this way, rather than by attempting to separate them from desirable products.

SUMMARY OF THE INVENTION

Therefore, it is an object of this invention to provide a process for producing an alkylation reaction product from an alkylatable reactant and an olefin-acting reactant.

Another object of this invention is to provide a novel apparatus for producing an alkylation reaction product utilizing a fluid catalyst.

In an embodiment, this invention relates to a process for producing an alkylation reaction product from an alkylatable reactant and an olefin-acting reactant, utilizing a fluid catalyst, which comprises the steps of: (a) introducing said reactants and a fluid comprising a first portion of said catalyst into the lower part of a vertically-extended, venturi-shaped zone maintained at alkylation conditions and passing said reactants and said first portion of catalyst vertically through said venturi-shaped zone directly into a vertically extended retention zone maintained at alkylation conditions and openly communicating with said venturi-shaped zone; (b) passing the effluent from said retention zone directly into a vertically extended separation zone, openly communicating with said retention zone, and separating said retention zone effluent into a catalyst phase and a reaction products phase; (c) withdrawing said catalyst phase from said separation zone to provide a catalyst recycle stream and withdrawing a portion of said reaction products phase from said separation zone to provide a reaction products recycle stream; (d) introducing the remaining portion of said reaction products phase directly into a vertically extended refluxing zone maintained at refluxing conditions and openly communicating with said separation zone and passing said remaining portion of said reaction products phase vertically through said refluxing zone; (e) introducing a fluid comprising a second portion of said catalyst into the downstream end of said refluxing zone and passing said second portion of catalyst downwardly through said refluxing zone; (f) withdrawing said second portion of said reaction products phase from the downstream end of said refluxing zone to form a products stream and recovering said alkylation reaction product from said products stream.

In another embodiment, this invention relates to a novel alkylation apparatus which comprises in combination:

(a) a vertically-disposed, venturi-shaped chamber having inlet means for introducing catalyst therein and inlet means for introducing reactants therein; (b) a vertically extended retention chamber connected to the upper end of said venturi-shaped chamber in open communication with said venturi-shaped chamber and having mixing means therein; (c) a vertically extended settling chamber connected to the upper end of said retention chamber and in open communication with said retention chamber having outlet means for withdrawing catalyst and outlet means for withdrawing reaction products; (d) a vertically extended refluxing chamber connected to the upper end of said settling chamber and in open communication with said settling chamber having inlet means for introducing catalyst and outlet means for withdrawing reaction products, and having fluids contacting means therein for contacting catalyst with reaction products.

Further objects and embodiments of the process of this invention will become apparent from the following description of the drawing and detailed description of this invention.

DESCRIPTION OF THE DRAWING

Referring to FIG. 1a, fluid catalyst is introduced into venturi-shaped chamber 2 of alkylation apparatus 1 through conduit 3 and flows vertically through chamber 2 into retention chamber 7. Alkylatable reactant and olefin-acting reactant enter chamber 2 through conduit 4 and are charged into the vertically flowing stream of catalyst by way of fluid distribution means 5 and a plurality of small-diameter nozzles 6 within chamber 2 connected to fluid distribution means 5. The reaction mixture formed from the reactants and catalyst in chamber 2 flows vertically through retention chamber 7. Chamber 7 is provided with a plurality of vertically spaced horizontal perforated plates 8 which serve to maintain intimate contact between the reaction mixture components as the reaction mixture flows through chamber 7. The reaction mixture flows vertically from chamber 7 directly into settling chamber 9, where a phase comprising primarily catalyst separates from a reaction products phase comprising primarily alkylation reaction product and unreacted alkylatable and olefin-acting reactants. The catalyst phase, being heavier, collects in the partially enclosed space in chamber 9 provided by horizontal baffle section 10 and weir 11. The catalyst is withdrawn from chamber 9 through conduit 12. The reaction products phase, being lighter, flows vertically through chamber 9. A portion of the reaction products phase collects in the partially enclosed space provided by horizontal baffle section 13 and partition plate 14. This portion of the reaction products phase is withdrawn from chamber 9 through conduit 15. The remaining portion of the reaction products phase flows from chamber 9 vertically, directly into refluxing chamber 16. Chamber 16 is provided with a plurality of vertically spaced horizontal baffle sections 17. The reaction products phase flows, generally in a vertical direction through chamber 16, collects at the top, and is withdrawn through conduit 20. A portion of catalyst is introduced into the top of chamber 16 through conduit 19, and flows generally downward, countercurrent to the vertical flow of the reaction products phase. A portion of the catalyst introduced into the top of chamber 16 is withdrawn at the bottom thereof through conduit 18.

Referring to FIG. 1b, there is shown a sectional detailed view of venturi-shaped chamber 2, taken along the line 1b—1b of FIG. 1a, illustrating an embodiment of the reactants fluid distribution means therein. Reactants enter chamber 2 through conduit 4 and are charged into the vertically moving stream of catalyst through a plurality of small diameter passageways in nozzles 6 in fluid distribution means 5.

DETAILED DESCRIPTION

Figure 1A:
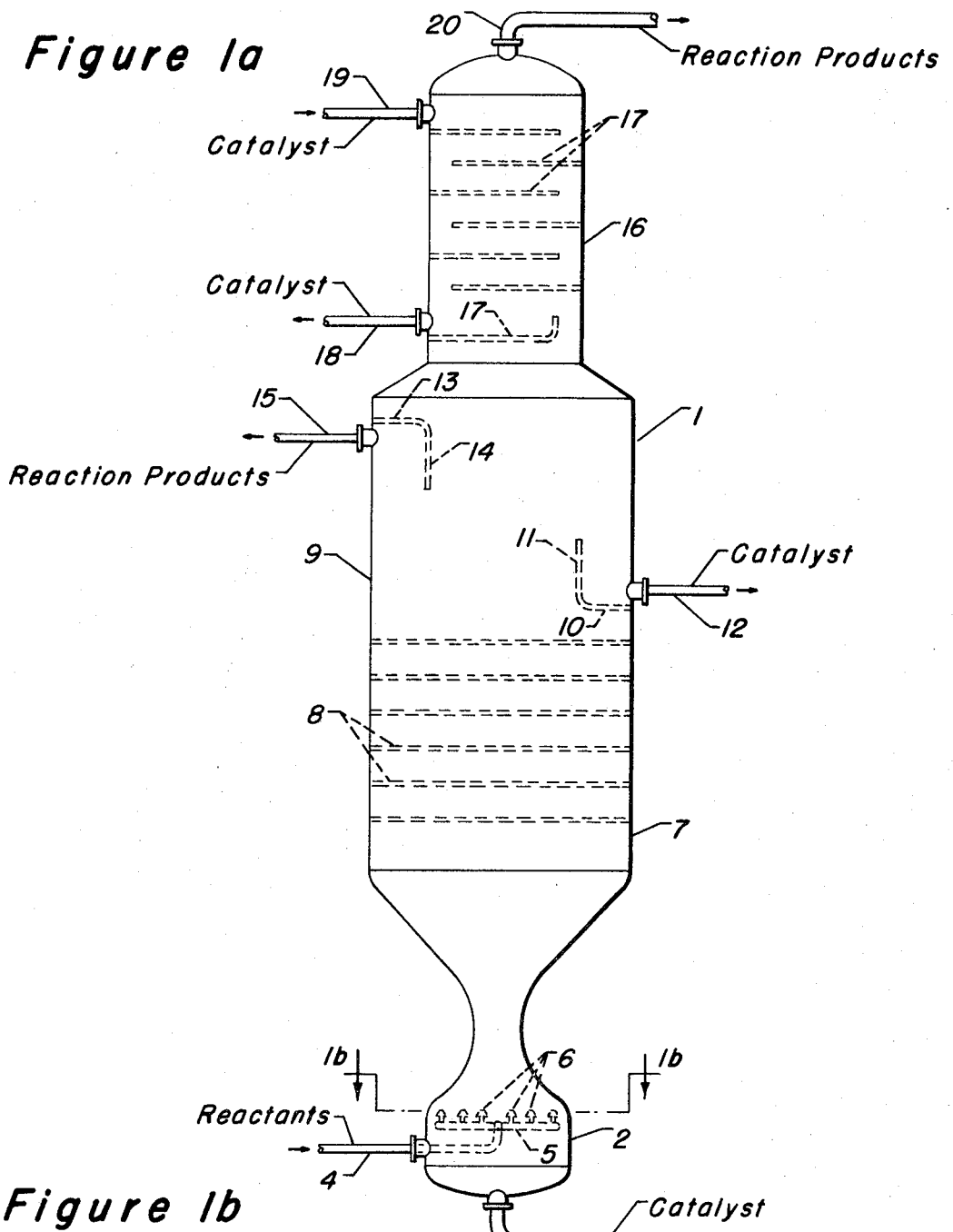
FIG. 1a is a vertically extended view of an embodiment of the alkylation apparatus of this invention.
Figure 1B:
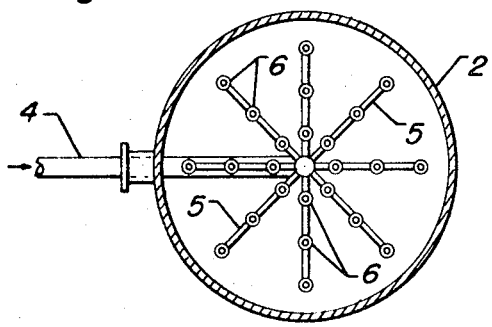
FIG. 1b is a section through the venturi-shaped chamber of the apparatus of this invention.

The method provided by this invention may be utilized to carry out a variety of fluid-catalyzed alkylation reactions. Examples of the catalysts suitable for use in an embodiment of the process and apparatus of this invention include sulfuric acid, hydrogen halides, boron halides, Friedel-Crafts catalyst, e.g. aluminum chloride, phosphoric acid, etc. Particularly suitable for use in an embodiment of the invention is a catalyst comprising from about 70 to about 100% hydrogen fluoride, by weight, and having, by weight, less than about 5% water content, and less than about 30% of other material including reactants, reaction products, etc. In an embodiment of this invention utilizing such a hydrogen fluoride catalyst, it is preferred that the portion of hydrogen fluoride catalyst charged to the venturi-shaped chamber comprise more than about 75% hydrogen fluoride, less than about 2% water and less than about 20%, by weight, of such materials as organic diluent, alkylatable reactant, etc. It is also preferred that the portion of catalyst introduced into the refluxing chamber of the apparatus of this invention comprises more than about 90% hydrogen fluoride, less than about 2% water and less than about 8% organic diluent, alkylatable reactant, etc.

Alkyatable reactants suitable for use in an embodiment of this invention include alkylatable aromatic hydrocarbons and alkylatable aliphatic hydrocarbons. Among the suitable aromatic hydrocarbons are benzene, mono- and polyalkyl benzenes, polycyclic aromatics, etc. Suitable aliphatic hydrocarbons include, for example, branched and linear paraffins. Particular alkylatable reactants may be more suitably utilized in combination with one particular catalyst than with another. For example, the hydrogen fluoride catalyst described above is particularly suitable for use with an alkylatable reactant comprising branched paraffins, particularly isoparaffins, while a phosphoric acid type catalyst may more suitably be employed when the alkylatable reactant is an aromatic hydrocarbon. Particularly preferred for use in an embodiment of this invention is an isoparaffin hydrocarbon, especially isobutane.

Olefin-acting reactants which may be employed include mono- and poly-olefinic hydrocarbons, alkyl halides, alkyl sulfates, alkyl phosphates, alcohols, etc., which may be utilized more appropriately with one particular catalyst than with another. For example, alkyl halides may appropriately be used in an embodiment wherein a hydrogen halide or boron halide catalyst is employed, while alkyl sulfates are more suitable for an embodiment employing sulfuric acid. In an embodiment of the present invention employing the hydrogen fluoride catalyst noted above, it is preferred to utilized propene, 1- and 2-butenes and isobutylene. These mono-olefins may be used when diluted with other hydrocarbons such as propane, butanes, etc. In particular, 2-butene is a preferred olefin-acting reactant.

Alkylation conditions in the venturi-shaped chamber of the apparatus of this invention will be determined primarily by temperature and pressure of the catalyst and reactants when they enter the chamber. It is contemplated that the temperature within the apparatus of this invention will be controlled by heating or cooling the reactants and catalyst externally, although means for influencing the temperature, such as bundles of heat exchange tubes, may be employed for heating or cooling within the disclosed apparatus, particularly in the retention chamber.

Typical alkylation reaction products which may be produced in the process and apparatus herein disclosed include alkylaromatics such as ethylbenzenes, propylbenzenes, etc., as well as higher molecular weight alkylaromatics having $C_{10}$–$C_{20}$ alkyl groups, useful as detergents. One of the important alkylation reaction products which can be produced by the methods herein disclosed is the above-described motor fuel alkylate, which is generally a mixture of branched chain heptanes and octanes. In a motor fuel alkylate, trimethylpentanes are considered higher quality, more desirable reaction products than dimethylhexanes or branched heptanes.

It is preferred that fluid distribution means be provided within the venturi-shaped chamber of the apparatus of this invention in order to introduce the reactants into the vertically flowing stream of catalyst with as uniform a distribution as possible. However, in contrast to previously disclosed alkylation methods, the reactants are not introduced into the catalyst at a higher velocity than that of the catalyst stream in order to produce an education effect on the catalyst. It is preferred that the reactants be introduced into the catalyst stream at a velocity less than that of the catalyst. This method of admixture creates a more uniform distribution of reactants and catalyst in the reaction mixture, and facilitates the formation of desirable reaction products. The sort of fluid distribution means utilized in a particular embodiment is not essential to the concept of this invention. A plurality of conduits and nozzles may be utilized as shown in the attached figure. Another suitable fluid distribution means comprises a nozzle having a plurality of small-diameter passageways through which reactants are passed into the vertically flowing catalyst.

Mixing means which may suitably be employed in the retention chamber of the apparatus herein disclosed includes vertically spaced horizontal perforated baffles, column packing, baffle sections, etc. Similarly, the fluids contacting means within the refluxing chamber in a particular embodiment of the apparatus of this invention may be vertically spaced horizontal baffle sections as shown in the attached figure. Also suitable are column packing, perforated horizontal baffles, etc. A particular embodiment of the mixing and contacting means is not essential to the concept of the present invention.

PREFERRED EMBODIMENT

In the preferred embodiment of the process and apparatus of this invention, a hydrogen fluoride catalyst, as described above, is utilized to facilitate the alkylation of isobutane with propene and butenes. The alkylation reaction in this embodiment is exothermic, but is desirable to avoid overly high temperatures in the venturi-shaped chamber and retention chamber because too high temperatures result in a lower quality alkylation reaction product. For this reason, it is necessary to introduce the catalyst, the reactants, or both, into the venturi-shaped chamber at a temperature low enough that the heat released in the reaction will not cause the temperature of the reaction mixture to rise above the desired level. As noted above, all, or a part of the heat released in the alkylation reaction may be withdrawn from the apparatus by employing heat exchange means in the retention chamber. When heat is withdrawn from the process by cooling the reactants, catalyst, etc., before charging them to the venturi-shaped zone, the pre-cooling may be practiced on the fresh reactants charged, on recycled or freshly charged catalyst, recycled hydrocarbons, or any combination of the above. It is preferred that the temperature of the hydrogen fluoride catalyst and of the reactants and recycled hydrocarbons charged to the venturi-shaped chamber be held within the range from about 30° F. to about 110° F. The reactants are introduced into the vertically flowing stream of acid in the venturi-shaped chamber through a plurality of small-diameter nozzles. The vertical velocity of the reactants, when they are introduced into the acid stream, is preferably about the same or less than the vertical velocity of the acid. Introducing the reactants into the acid in this manner prevents an undesirable build up of reactants in the reaction mixture, which could otherwise result in the creation of low quality reaction products. The plurality of nozzles provides an advantageous geometric distribution of the reactants in the catalyst to provide a reaction mixture favorable to the formation of desirable products.

The reaction mixture of catalyst, reactants, reaction products, etc., flows vertically into the retention chamber, which is provided with a plurality of vertically-spaced perforated plates. As the reaction mixture passes vertically through the retention chamber, the perforated plates act as mixing means to maintain the components of the reaction mixture in intimate contact with one another. The hold-up time for the reaction mixture in the retention chamber, defined as the volume of the chamber divided by the volume of reaction mixture charged per minute, is between about 0.5 minute and 10 minutes.

As the hydrogen fluoride catalyst, reaction products and unconsumed reactants pass vertically, from the retention chamber into the settling chamber, a lighter phase, comprising primarily reaction products and unconsumed reactants, separates from a heavier catalyst phase comprising primarily hydrogen fluoride catalyst. Separation conditions maintained in the settling chamber include a temperature and pressure sufficient to maintain the catalyst and reaction products in the liquid phase. Preferably, this includes a temperature in the range from about 0° F. up to about 150° F., and a pressure in the range from about 1 atmosphere up to about 40 atmospheres.

As catalyst collects in the open-topped, partially enclosed space at the lower, upstream end of the settling chamber, it is withdrawn and subsequently charged once more to the venturi-shaped chamber. The catalyst withdrawn from the settling zone may be cooled before re-use, as a means of controlling the temperature in the apparatus.

The portion of the reaction products phase which is collected in the open-bottomed partially enclosed space at the upper, downstream end of the settling chamber is withdrawn and, preferably, charged with fresh reactants to the venturi-shaped chamber. The portion of reaction products phase thus recycled serves to dilute the olefin-acting reactant, a condition favorable to the production of a high quality reaction product.

One of the benefits obtained from the invention which is herein disclosed and which provides a method of alkylation superior to previously disclosed methods, is that the refluxing of reaction products with higher strength hydrogen fluoride is obtained without resorting to a plurality of vessels extraneous to the alkylation apparatus which are capable of operating under relatively severe conditions in the presence of the hydrogen fluoride. The necessity of maintaining a significant inventory of catalyst outside the alkylation apparatus is obviated by this method of operation. When a portion of the reaction products is withdrawn from the settling chamber and recycled to the venturi-shaped chamber, the remaining portion of reaction products, i.e., the portion which is refluxed with higher strength acid, may thereby be more thoroughly contacted with the limited amount of higher strength acid generally available in commercial alkylation units. The higher acid/reaction products ratio thus achievable in the refluxing step results in the more complete elimination of organic fluorides, unused reactants and low quality reaction products, and, in general, favors the formation of the desired products. The portion of reaction products phase not collected and withdrawn from the separation chamber, as described above, continues to flow vertically into the refluxing chamber, and downstream through the convoluted passageway provided by the plurality of vertically spaced horizontal baffle sections in the refluxing chamber. Simultaneously, relatively high strength hydrogen fluoride is introduced into the upper, downstream end of the refluxing chamber, and flows upstream, counter-current to the reaction products phase. By means of the vertically-spaced baffle sections, the high strength catalyst and reaction products are brought into intimate contact. This results in the conversion of alkyl fluorides, present in the reaction products phase, into the desired alkylation reaction product, and in the more complete conversion of any reactants present. The refluxing catalyst may be wholly or partially withdrawn from the bottom of the reflux chamber, or allowed to return into the settling chamber to be combined with the catalyst utilized in the venturi-shaped chamber and the retention chamber. The portion of the reaction products phase introduced to the refluxing chamber collects at the downstream, top end of the refluxing chamber and is withdrawn and further processed to recover the desired alkylation reaction product, generally by fractionation.

I claim as my invention:

1. A process for producing an alkylation reaction product from an alkylatable reactant and an olefin-acting reactant, utilizing hydrogen fluoride catalyst, which comprises the steps of:
   (a) introducing said reactants and a first portion of said catalyst into the lower part of a vertically-extended venturi-shaped chamber maintained at alkylation conditions and passing said reactants and said first portion of catalyst vertically through said venturi-shaped chamber directly into a vertically-extended retention chamber maintained at alkylation conditions and communicating with said venturi-shaped chamber;
   (b) passing the effluent from said retention chamber directly into a vertically-extended separation chamber, maintained at separation conditions and communicating with said retention chamber, and separating said retention chamber effluent into a catalyst phase and a reaction products phase;
   (c) withdrawing said catalyst phase from said separation chamber to provide a catalyst recycle stream and withdrawing a portion of said reaction products phase from said separation chamber to provide a reaction products recycle stream;
   (d) introducing the remaining portion of said reaction products phase directly into a vertically-extended refluxing chamber maintained at refluxing conditions and communicating with said separation chamber and passing said remaining portion of said reaction products phase vertically through said refluxing chamber;
   (e) introducing a second portion of said catalyst into the upper end of said refluxing chamber and passing said second portion of catalyst downwardly through said refluxing chamber;
   (f) withdrawing said second portion of said reaction products phase from the upper end of said refluxing chamber to form a products stream and recovering said alkylation reaction product from said products stream.

2. The process of claim 1 further characterized in that said second portion of said catalyst contains a higher weight percent of hydrogen fluoride than said first portion of said catalyst.

3. The process of claim 1 further characterized in that at least a portion of said second portion of said catalyst is withdrawn from the lower end of said refluxing chamber to form a refluxing recycle stream.

4. The process of claim 1 further characterized in that at least a portion of said catalyst recycle stream is introduced into said venturi-shaped chamber.

5. The process of claim 1 further characterized in that at least a portion of said products recycle stream is introduced into said venturi-shaped chamber.

6. The process of claim 1 further characterized in that at least a portion of said refluxing recycle stream is introduced into said upper end of said refluxing chamber.

7. Alkylation apparatus which comprises in combination:
   (a) a vertically-disposed, venturi-shaped chamber having inlet means for introducing catalyst therein and inlet means for introducing reactants therein;
   (b) a vertically-extended retention chamber connected to the upper end of said venturi-shaped chamber, said retention chamber communicating throughout its cross-section area with said venturi-shaped chamber and having mixing means therein;
   (c) a vertically extended settling chamber connected to the upper end of said retention chamber, said settling chamber communicating through its cross-section area with said retention chamber and having outlet means for withdrawing catalyst and outlet means for withdrawing reaction products;
   (d) a vertically-extended refluxing chamber connected to the upper end of said settling chamber, said refluxing chamber communicating throughout its cross-section area with said settling chamber and having inlet means for introducing catalyst, outlet means for withdrawing reaction products, and fluid-contacting means therein for contacting catalyst and reaction products.

8. The apparatus of claim 7 further characterized in that said settling chamber includes a horizontal baffle section connected to the periphery of said settling chamber below said catalyst outlet means and a weir connected to said horizontal baffle section and extending vertically above the level of said catalyst outlet means to provide a catalyst collection space.

9. The process of claim 7 further characterized in that said settling chamber includes a horizontal baffle section connected to the periphery of said settling chamber above said reaction products outlet means and a partition plate connected to said baffle section and extending downwardly below the level of said reaction products outlet means to provide a reaction products collection space.

10. The process of claim 7 further characterized in that said refluxing chamber includes a plurality of horizontally-extended baffle sections connected to the periphery of said refluxing chamber.

11. The process of claim 7 further characterized in that said venturi-shaped chamber includes a reactant distribution means therein, said means being connected to said reactant inlet means for distributing reactants therein.

References Cited
UNITED STATES PATENTS

| | | | |
|---|---|---|---|
| 3,169,152 | 2/1965 | Van Pool et al. | 260—683.48 |
| 3,213,157 | 10/1965 | Hays et al. | 260—683.48 |
| 3,249,649 | 5/1966 | Sherk et al. | 260—683.48 |
| 3,435,092 | 3/1969 | Hutson, Jr., et al. | 260—683.48 |
| 3,495,949 | 2/1970 | Niedner et al. | 23—288 E |

DELBERT E. GANTZ, Primary Examiner

G. J. CRASANAKIS, Assistant Examiner

U.S. Cl. X.R.

23—288